(No Model.)
W. SCOTT.
FLEXIBLE PIPE COUPLING.
No. 547,504. Patented Oct. 8, 1895.
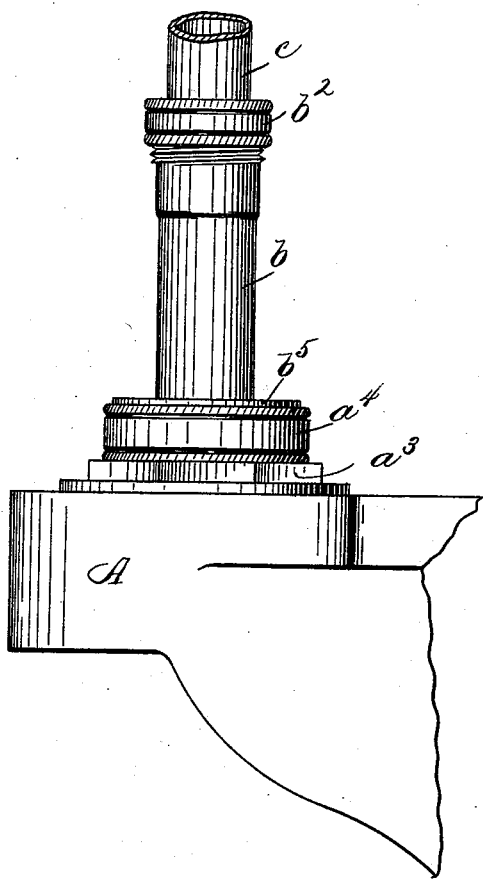
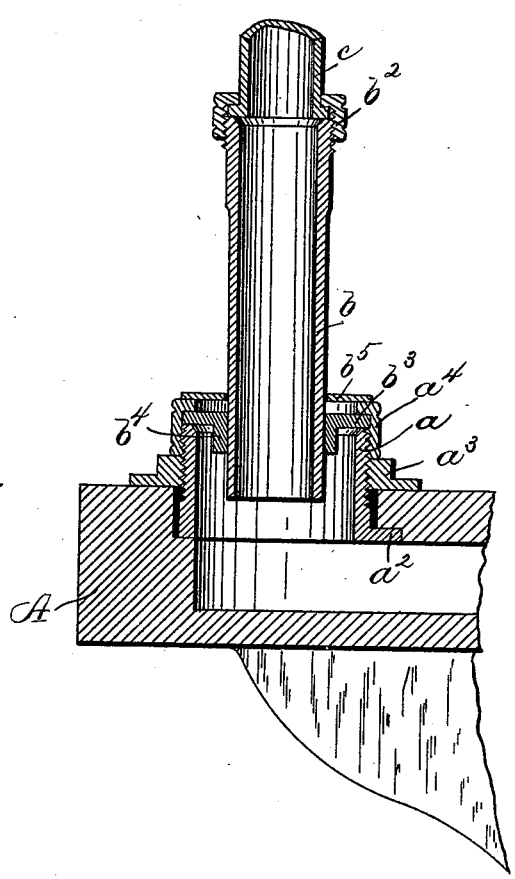
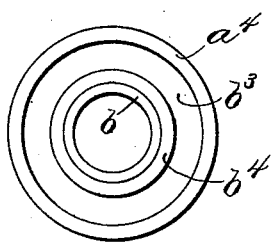
Witnesses
Jas. J. Maloney
H. Livermore
Inventor
William Scott
by Jno. P. Livermore
Att'y

UNITED STATES PATENT OFFICE.

WILLIAM SCOTT, OF MEDFORD, ASSIGNOR TO THE DALTON-INGERSOLL COMPANY, OF BOSTON, MASSACHUSETTS.

FLEXIBLE PIPE-COUPLING.

SPECIFICATION forming part of Letters Patent No. 547,504, dated October 8, 1895.

Application filed May 2, 1894. Serial No. 509,778. (No model.)

*To all whom it may concern:*

Be it known that I, WILLIAM SCOTT, of Medford, county of Middlesex, State of Massachusetts, have invented an Improvement in Flexible Pipe-Couplings, of which the following description, in connection with the accompanying drawings, is a specification, like letters on the drawings representing like parts.

My invention relates to pipe-couplings and is embodied in a flexible coupling especially adapted for use in coupling a metallic-pipe section to a pipe or passage formed integral with an earthenware receptacle—such, for example, as the bowl of a water-closet or a porcelain washbowl or bath-tub. In baking the earthenware the portion thereof containing the pipes or passages is likely to become somewhat warped, so that the coupling-surface thereof is not always perfectly true, in which case the metallic spud or coupling piece, which is commonly connected directly to the earthenware, will not always register with the external pipe to which it is to be connected, thus making it a matter of some difficulty to fit the two parts together, as it necessitates bending the said external pipe, so that it will register with the spud before the two parts can be connected together. Further than this, after the parts are thus connected there is a liability of their being strained by the settling of the floor or support upon which the earthenware receptacle is set, and such a strain is likely to crack or break away that part of the earthenware receptacle in which the metallic piece is secured.

The present invention aims to obviate these difficulties by providing a coupling having a member adapted to be secured in the opening of a passage formed in a porcelain or earthenware receptacle, the said member preferably forming the outer member of the coupling, the other member of which may consist of a piece of tubing adapted to be connected with the pipe which is to be coupled to the earthenware, or which may be the said pipe itself, the two members being telescoped and connected together by a suitably-flanged thimble of resilient material.

Figure 1 is a vertical elevation of a coupling embodying the present invention, shown in connection with the service-pipe of a water-closet bowl to which the outer member of the coupling is secured in the ordinary way. Fig. 2 is a vertical section through the center of Fig. 1; and Fig. 3 is an end view, in plan, of the inner member of the coupling.

The outer member of the coupling consists of a metallic spud $a$, of any suitable or usual construction, adapted to be secured to the earthenware and provided for this purpose with fingers or extensions $a^2$ at its lower end, adapted to be engaged by suitable recesses in the projection A, which contains the inlet-pipe of the said earthenware receptacle. A lock-nut $a^3$, threaded on the outside of the said tube $a$, is adapted to be screwed down upon the surface of the said projection A in the usual manner.

The inner member $b$ consists of a section of pipe or tube adapted to be coupled to the pipe $c$, which is the external pipe to be connected to the passage in the extension A, a coupling $b^2$ being provided for this purpose; or, if desired, the said pipe $c$ itself might form the inner member of the coupling. The said pipe $b$ is of considerably smaller diameter than the pipe $a$, and may be inserted therein any desired distance, there being sufficient clearance between the outside of the pipe $b$ and the inside of the pipe $a$ to allow considerable movement of one relative to the other away from the line of their common axis when parallel. In order to obtain a water-tight connection between the said pipe $b$ and the pipe $a$, which may be termed the "inner" and "outer" members, respectively, of the coupling, a thimble or collar of resilient material is fitted tightly around the outside of the said inner member and provided with a flange $b^3$, extending outward therefrom, so that it overlaps the end of the outer member $a$, to which it is secured by a flanged coupling-piece $a^4$, the said coupling-piece being internally threaded and adapted to be screwed down upon the outside of the pipe $a$, clamping the flange $b^3$ securely thereto, thus closing the opening between the two pipes. The said flange $b^3$ is preferably of rubber and formed integral with a short tubular section $b^4$, as shown, thus forming a flexible flanged thimble of sufficient length to afford a secure bearing against the surface of the tube $b$, while the flange $b^3$, extending outward therefrom, is adapted to engage the end of the tube $a$, as above described. In this way a secure water-tight joint is afforded between the flange $b^3$ and the member $b$, the pressure of the water on the outside of the tubular section $b^4$ tending to press it firmly against said member, which would not be the case if a plain disk or washer of uniform thickness throughout were used, while greater flexibility is secured, since the said flange may be made thinner than would otherwise be practicable.

In order to give a finished appearance to the coupling and also to protect the flange $b^3$ from damage, a thin annular metallic disk $b^5$ is loosely fitted around the upper member $b$ and rests upon the top of the coupling-piece $a^4$, thus covering that portion of the disk $a^4$ which is exposed between the pipe $b$ and the said coupling-piece. The cover $b^4$ is not in any way fastened to either member, and therefore does not affect the flexibility of the coupling.

I claim—

1. The combination with an earthenware receptacle having a passage to be connected with an external pipe, of an outer coupling member consisting of a spud adapted to be secured to said receptacle at the opening of said passage, and an inner coupling member consisting of a tubular portion smaller in diameter than the said spud; a flanged thimble of resilient material such as rubber having a tubular portion fitting closely around the outside of the inner member, and a flange extending outward therefrom into engagement with the end of the outer coupling member; and a coupling piece adapted to be secured to the said outer member and having an inwardly extending flange adapted to overlap the flange of said thimble, as set forth.

2. The combination of the outer member consisting of an externally screw-threaded metallic spud $a$ provided with fingers $a^2$ adapted to engage recesses in the walls of an earthenware receptacle, and a coupling nut cooperating with the external thread thereof; with an inner member and a flexible flanged thimble fitting closely around the outside of said inner member and provided with an annular flange extending outward from the said inner member over the end of the said spud, and a coupling piece cooperating with the external thread thereof for securing the said flange to the said spud, as set forth.

3. The combination with an earthenware receptacle having a passage to be connected to an external pipe; of a flexible coupling comprising an outer member adapted to be secured to said receptacle at the mouth of said opening, and an inner member consisting of a tubular portion extending into said outer member; a flexible flanged thimble fitting closely around the outside of the said inner member the flanged portion thereof extending outward from said inner member over the end of the outer member, a coupling piece having an inwardly extending flange adapted to overlap said flanged portion, and a loose flat disk or collar surrounding the inner member and supported upon the surface of said coupling piece, as set forth.

In testimony whereof I have signed my name to this specification in the presence of two subscribing witnesses.

WILLIAM SCOTT.

Witnesses:
H. J. LIVERMORE,
JAS. J. MALONEY.